United States Patent Office 3,585,072
Patented June 15, 1971

3,585,072
DEPOSITION OF A LAYER OF MANGANESE DIOXIDE FROM A PERMANGANATE SOLUTION BY CHEMICAL REDUCTION OF THE PERMANGANATE
William Klasek Templeton, Kernersville, N.C., assignor to Western Electric Company, Incorporated, New York, N.Y.
No Drawing. Continuation-in-part of application Ser. No. 752,478, Aug. 14, 1968. This application May 19, 1969, Ser. No. 826,007
Int. Cl. B44d 1/02
U.S. Cl. 117—201
38 Claims

ABSTRACT OF THE DISCLOSURE

A manganese dioxide film is deposited on a workpiece by the chemical reduction of a permanganate and the precipitation of manganese dioxide. The workpiece is immersed in a permanganate solution and a reducing agent, such as methyl alcohol, is added at a gradual rate to the solution to precipitate and deposit manganese dioxide on the workpiece. The permanganate solution is maintained at an acid pH by the addition of concentrated acid to the solution at specified intervals during the deposition.

CROSS REFERENCE TO RELATED APPLICATION

This is a continuation-in-part of my copending application, Ser. No. 752,478, filed Aug. 14, 1967, which is now abandoned.

BACKGROUND OF THE INVENTION (1) Field of the invention

The present invention relates to a method of depositing a film of manganese dioxide $(MnO_2)$ on a workpiece. In particular, this invention concerns the deposition of manganese dioxide on a thin layer of dielectric formed on a substrate in the fabrication of electrical devices, such as integrated circuits, thin film components, etc. Manganese dioxide exhibits an unusual property of being able to heal electrical shorts which may occur through the dielectric layer. One theory is that heat produced by current through the short reduces the manganese dioxide adjacent the short to a lower oxide of manganese having a high resistivity. Such properties make manganese dioxide useful in electrical devices where a dielectric layer separates two conductive or semiconductive materials.

In one example of the use of manganese dioxide, a thin film tantalum capacitor has successive layers of tantalum, pentoxide, manganese dioxide, and aluminum. The tantalum pentoxide is a dielectric separating the conductive layer of tantalum and the semiconductive layer of manganese dioxide. The aluminum provides a conductive contact to the manganese dioxide. This thin film tantalum capacitor exhibits healing properties in that leakage current through the capacitor is reduced by aging the capacitor with a D.C. voltage. It is believed that some of the initial leakage current is due to shorts and imperfections in the dielectric layer which are healed by the manganese dioxide.

The properties of the thin film tantalum capacitor are dependent upon the density and thickness of the manganese dioxide. The dissipation factor (the ratio of series resistance to capacitive reactance) varies directly with the thickness of the manganese dioxide layer. Thus, for a low dissipation factor, a thin layer of manganese dioxide is desirable. The leakage current through the capacitor varies inversely with the thickness. Thus, for a low leakage current and good healing properties, a thick layer of manganese dioxide is desirable. A thick film of manganese dioxide in a capacitor results in a capacitor with less reactive capacitance than the reactive capacitance of a capacitor with a thin film of manganese dioxide. Both the leakage current and the dissipation factor are reduced by making the manganese dioxide layer more dense. The capacitance reactance is increased by making the manganese dioxide layer more dense. The adherance of the aluminum layer to the capacitor is lessened by increasing porosity and thickness of the manganese dioxide. The most desirable capacitor characteristics are produced by making the manganese dioxide layer as dense as possible with a thickness that results in a dissipation factor below the maximum tolerable limit and that results in adequate adherence between the various layers.

While the properties of a thin film tantalum capacitor have been specifically discussed, the requirements for a low leakage current and adequate adherence between different materials is applicable to any electrical device where a dielectric layer and a manganese dioxide layer separates two conducting or semiconducting materials.

(2) Prior art

There are several known methods of depositing manganese dioxide. One such method is the pyrolysis of manganous nitrate $Mn(NO_3)_2$. In one example of this method, a substrate to which a film of manganese dioxide is to be applied is heated on a hot plate to approximately 300° C. An aqueous manganous nitrate solution is sprayed on the heated substrate, and the solution decomposes on contact with the substrate to form manganese dioxide. This method of applying manganese dioxide has several disadvantgaes: (1) the layer of manganese dioxide is very porous; (2) the deposition occurs nonuniformly over the surface, thus requiring several applications to cover imperfections in the deposited manganese dioxide film; and (3) the elevated temperature required to decompose the manganous nitrate may adversely affect other electrical components formed on the substrates.

The prior art describes another method of depositing manganese dioxide which involves the chemical reduction of a permanganate by nitric acid. In this method, the substrate is submerged in an agitated solution of potassium permanganate. The addition of concentrated nitric acid to the solution reduces the permanganate, and deposits manganese dioxide on the substrate. In trying to utilize this prior art process, the addition of colorless concentrated nitric acid ($HNO_3$) to the solution produced very little deposit of manganese dioxide on the substrate. Only nitric acid which had been exposed to light for lengthy periods of time and had partially decomposed and had become yellow produced sufficiently thick deposits of manganese dioxide on the substrate. Partially decomposed nitric acid contains dissolved nitrogen dioxide ($NO_2$). Since the amount of deposition of manganese dioxide is dependent upon the decomposition of the nitric acid, it is difficult to control the thickness of the manganese dioxide deposition. Also, the deposition of manganese dioxide was non-linear, with most of the deposition occurring immediately after the addition of the decomposed nitric acid.

There is also a suggestion in the prior art that formic acid, methyl alcohol, acetone, formaldehyde and other reducing agents may be used for reducing permanganate to manganese dioxide. While it is known that many reducing agents reduce permanganate to manganese dioxide, the simple addition of such reducing agents to permanganate solutions usually produces inferior films or deposits of manganese dioxide on substrates. These inferior films are characterized by being very thin, porous, or non-adherent.

SUMMARY OF THE INVENTION

The process of the present invention involves an improved technique for depositing a film of manganese dioxide on a surface. The improved deposition technique produces a dense, uniform film of manganese dioxide which improves the quality and reliability of the electrical devices in which they are applied.

The present invention concerns the chemical reduction of a permanganate to precipitate and deposit a film of manganese dioxide on the workpiece. The invention is particularly concerned with the addition of a reducing agent at a gradual rate to a permanganate solution to produce a slow rate of precipitation and deposition of manganese dioxide resulting in a dense adherent layer of manganese dioxide. In this connection, it is desirable that the rate of deposition is substantially to completely linear with respect to time.

The present invention additionally concerns the reducing agents used to reduce the permanganate solution and in particular the necessity to maintain an acid pH in the solution in order to obtain a dense, uniform film of manganese dioxide.

One embodiment of the invention contemplates the use of an alcohol in an acidic solution to reduce the permanganate and produce a dense, uniform film of manganese dioxide on the substrate.

DETAILED DESCRIPTION

Generally, the process of this invention concerns the deposition of manganese dioxide ($MnO_2$) on a substrate by the chemical reduction of a permanganate. The substrate generally, but not necessarily, has a base material upon which thin films of dielectric, semiconductive, and/or conductive layers are deposited in the manufacture of thin film devices, such as integrated circuits or discrete components. The manganese dioxide layer is deposited preferably on a dielectric layer which separates two layers which are either conductive or semiconductive. The ability of the manganese dioxide layer to heal shorts through the dielectric layer improves the reliability and yield of the thin film devices.

The initial aqueous permanganate solution used on a batch basis contains permanganate ion generally in a molar concentration of about 0.01 M to 1.0 M, preferably 0.1 M to 0.5 M. If the permanganate is continuously replenished during the deposition, the molar concentration thereof is generally about 0.1 to 0.5, preferably 0.3 to 0.5 molar. For producing the solution of permanganate ion, it is preferred to employ a solution of an alkali metal permanganate such as sodium or potassium permanganate, but there can also be used any solution containing other permanganate salts from which manganese dioxide may be precipitated by a reducing agent.

Several reducing agents have demonstrated their ability to successfully reduce permanganate and deposit a film of manganese dioxide on a substrate. Among these are methyl alcohol ($CH_3OH$), dissolved nitrogen dioxide ($NO_2$), oxalic acid ($H_2C_2O_4$), formic acid ($HCO_2H$), and formaldehyde ($HCHO$). Other reducing agents, such as homologs, e.g., ethyl alcohol, can also produce acceptable films of manganese dioxide. Generally, other reducing agents can be selected from redox tables, and by routine experimentation one can determine those which will work the best. Usually, the reducing agent, if not concentrated nitric acid, is advantageously added as an aqueous solution ranging from a concentration of 8 to 100 (no water), preferably 22 to 44 percent by weight. The concentration of reducing agent employed is dependent upon the concentration of the permanganate and upon the desired rate of manganese dioxide deposition. In any case, this invention contemplates the use of all operable reducing agents inasmuch as an important aspect of the invention is in the technique of using the reducing agent rather than in the selection of any specific reducing agent.

From a practical viewpoint, methyl alcohol is considered the most desirable reducing agent because it is easy to handle, readily available and produces films having qualities as good or better than the other reducing agents tested.

In order to produce a uniform dense layer of manganese dioxide having a desired thickness on a substrate, it surprisingly has been found necessary to add the reducing agent at a slow or gradual rate to the permanganate solution, this requirement being especially crucial when organic reducing agents such as methyl alcohol and when concentrated solutions of permanganate are employed. It is preferred to add the reducing agent at a rate of about just fast enough to continually produce and deposit manganese dioxide. Otherwise, if the reducing agent is added at a fast rate (for example, poured in over a 1–5 second interval), an excessive amount of manganese dioxide is immediately produced. Most of the manganese dioxide formed at this rapid rate does not deposit on the substrate as an adherent film, but rather forms small non-adherent particles forming a manganese dioxide powder in the reaction medium. Of the manganese dioxide formed in the solution, generally, not more than 90%, and preferably not more than 70% should be the non-adherent manganese dioxide powder or precipitate. Where excessive amounts of non-adherent precipitate are formed, the quantities and strength of the permanganate solution and the reducing agent can be controlled to produce a more or less predetermined thickness of manganese dioxide, but there is no corresponding control of the density, uniformity, and adhesiveness of the resultant film. It is thus highly advantageous in this invention to add the reducing agent to the permanganate solution at a substantially uniform rate over a period of at least three minutes, preferably at least 15, and especially preferred at least 30 minutes to produce a predetermined thickness of manganese dioxide. The deposition occurs at a relatively linear rate over the period that the reducing agent is gradually added. When the film reaches the desired thickness, the addition of the reducing agent may be stopped and the substrate removed from the solution.

In general, the conditions of the reduction step are such that the deposition of the $MnO_2$ layer is substantially linear with respect to time and occurs at a rate of about not more than 10, preferably in the range of 2 to 4 angstroms per second. If excessive rates of deposition are used, a non-adherent and relatively porous manganese dioxide film is obtained.

When methyl alcohol, oxalic acid, formic acid, or formaldehyde are added to a nearly saturated potassium permanganate solution at a fast rate, but at much slower than a pour rate, the manganese dioxide is formed at such a rapid rate in the solution that it deposits on the substrate as a fluffy non-adherent porous layer. For example, when methyl alcohol is added to an acidic 0.5 molar potassium permanganate solution at a rate of only 100 ml. per minute per liter of 0.5 molar aqueous permanganate solution at 60° C., a fluffy non-adherent porous film of manganese dioxide is produced. It has now been unexpectedly discovered that these same reducing agents, when added at a much slower rate, produce a layer of manganese dioxide having an acceptable density. For example, when the rate of addition of methyl alcohol is decreased to approximately 1 ml. per minute per liter of 0.5 molar potassium permanganate solution, there is obtained a dense adherent film of manganese dioxide.

When fuming nitric acid or concentrated nitric acid containing dissolved nitrogen dioxide is used as a reducing agent, the rate of addition of the nitric acid solution is dependent upon the concentration of the dissolved nitrogen dioxide. The more dilute the concentration of nitrogen dioxide in the nitric acid, the faster the nitric acid solution can be added to a given concentration of permanganate. Generally, the rate of addition of nitrogen dioxide must conform to the gradual rates of addition of other reducing agents even though the addition of nitric acid containing small quantities of dissolved nitrogen dioxide may be added at a relatively fast rate. Accordingly, a larger quantity of such a nitric acid solution must be added to produce the same thickness of manganese dioxide film as produced by more concentrated solutions of other reducing agents.

In general, based on 1 liter of a 0.5 molar solution of permanganate, the rate of addition of all reducing agents should not exceed about 0.1, preferably not more than .01 mole per minute. For methyl alcohol in particular as the reducing agent, it is preferred that the rate not exceed about .01, especially preferred not more than .004 mole per minute.

Of course, the rate of addition of reducing agent is also dependent upon the concentrations of permanganate and reducing agent. Relatively weaker solutions may be mixed at faster rates without producing excessive concentrations of manganese dioxide in the reaction medium. It is the excessive concentrations of manganese dioxide in the reaction medium which produce the non-adherent, porous deposits. Acceptable ranges of concentrations of $MnO_2$ are stated conveniently, for example, in terms of rates of addition of reducing agents to permanganate solutions, as indicated in the preceding paragraphs.

Another important parameter relating in particular to the density of the films is the pH of the reaction medium during deposition. An acidic reaction medium tends to prevent the formation of manganese dioxide powder in the medium. Whereas the pH of a 0.5 molar potassium permanganate solution is approximately 10.6, it has been found that if the pH of the solution is not reduced, porous films of manganese dioxide are produced. Thus, it is highly beneficial to reduce the initial pH of the permanganate solution to below 7, preferably below 4, in order to deposit a dense adherent film of manganese dioxide on the substrate. Tests have indicated, in general, that permanganate solutions which are reduced to a very low pH of about 1 to 4 produce the best results in uniformity, density and adherence of the manganese dioxide films.

When nitrogen dioxide, dissolved in concentrated nitric acid or in another relatively strong acid is used as a reducing agent, the acid makes the solution sufficiently acid to deposit a dense adherent film of manganese dioxide. Also, oxalic acid produces acceptable films of manganese dioxide without the addition of any other acid to the solution. However, when formic acid, formaldehyde or methyl alcohol is used as the reducing agent, acid must be initially added to the solution to make the pH of the solution acidic. Additionally, acid is added during the deposition to maintain the acid pH. This additional acid may be mixed with the reducing agent which is being used. Strong acids such as nitric acid ($HNO_3$), sulphuric acid ($H_2SO_4$), and hydrochloride acid (HCl) appear to be the most economical. Other acids, such as weakly acidic acetic acid ($CH_3COOH$) produce satisfactory results in the process of depositing manganese dioxide, but require a large quantity of acid when compared to the quantity of a strong acid required to produce a dense uniform film of manganese dioxide.

When methyl alcohol is used as the reducing agent, the best results are obtained when the pH of the permanganate solution is maintained at a value of 2 or less, during the entire deposition process. For practical considerations, it is unnecessary for the pH to be lower than about 0.8.

Aside from an improvement in the density of the films, the rate of deposition thereof is also increased as the pH is decreased, since the concentration of manganese dioxide in the reaction medium may also be increased.

The temperature of the solution also affects the deposition of the manganese dioxide film. Manganese dioxide films formed at temperatures greater than 50° C. especially at about 60–75° C., are superior in density, uniformity, thickness and adherence to the substrate than films formed at or below 50° C. Temperatures above 75° C. up to about 100° C. can also be used, but no appreciable improvement is obtained.

The solution must also be agitated, preferably vigorously, during the deposition to produce a satisfactory film of manganese dioxide on the substrate. Very little deposition which was non-uniform occurred on the substrate when the solution was not agitated. For the purposes of this invention, vigorous agitation is defined as non-laminar motion of the liquid deposition media at the substrate-liquid interface.

With respect to the obtaining of films having a good adhesive bond to the substrate, it is important that the substrate, if a smooth material-like glass, should be well cleaned before the deposition step. A standard cleaning system is satisfactory, for example, the sequential steps of: (1) 10 minutes in trichloroethylene vapor; (2) 10 minutes in boiling Alconox; (3) a spray rinse in deionized (D.I.) water; (4) 10 minutes in overflowing boiling D.I. water; and (5) a pre-purified nitrogen dry. Even better results are obtained if the standard cleaning system is followed by a five minute dip in Neutra Clean 7 at 50° C.

Since even smooth glass can be satisfactorily coated with an adherent coating of $MnO_2$ according to this invention, it is apparent that a wide variety of other substrates can also be used, such as metallic, organic (polymeric), and inorganic surfaces. Etched and other rough surfaces are easily coated even without any intermediate cleaning steps. Representative substrates include, but are not limited to metallic oxides such as tantalum oxide, silicon monoxide, and in general the oxides obtained by the anodization of the valve metals. The valve metals include aluminum, antimony, bismuth, hafnium, niobium, tantalum, titanium, tungsten and zirconium. In general, a relatively thin layer of manganese dioxide covering any metal oxide capacitor dielectric will improve capacitor yield and reliability.

By selecting the indicated values of all the parameters discussed above, such as rate of addition, pH and temperature, there is obtained the best deposition process. However, it is to be understood, that each parameter is useful in itself for obtaining an improved result in the deposition process. For example, all things being equal, a low pH contributes to better densities and higher rates of deposition.

In the manufacture of thin film devices, commonly known techniques are employed to produce the metal or semiconductive patterns and dielectric layers. For example, in the manufacture of tantalum capacitors, a tantalum film is first sputtered on a glass substrate and then anodized. Commercial resist materials and etching solutions are then used to produce a plurality of bottom electrodes covered by dielectric layers on the substrate. Next, the process of this invention is utilized to produce a layer of manganese dioxide on the surface of the dielectric layers and exposed substrate. Then a conventional photosensitive resist is coated on the manganese dioxide layer. After exposure and development of the resist, a solution containing 5% (by volume) nitric acid ($HNO_3$), 10% hydrogen peroxide ($H_2O_2$) and 85% water ($H_2O$) is used to etch the exposed manganese dioxide. Vacuum evaporation of a metal, such as aluminum, through a mechanical mask deposits the top electrodes on the layers of manganese dioxide to complete the thin film capacitors.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

In the following examples of the use of the invention, the deposition of manganese dioxide is performed in a beaker which is placed on a magnetic stirring hot plate. A plurality of glass substrates with films of tantalum and tantalum pentoxide thereon are suspended vertically on a stainless steel wire rack around the inside wall of the beaker. The substrates are arranged tangentially around the beaker such that the surface to be coated faces toward the center of the beaker. A Teflon coated magnetic bar in the center of the beaker is utilized to stir the solution in the beaker. The solution is agitated by the magnetic stirrer to a point just below that at which the solution splashes out of the beaker to provide a rapid flow of solution over the surface of the substrates. The solution is heated to the desired temperature by the heating element of the hot plate, and then the temperature of the hot plate is reduced, the solution temperature being thereafter maintained by the addition of reducing agent. Then acid and reducing agent are added as required to the permanganate solution. A needle valve buret or a separatory funnel equipped with a needle valve, may be utilized to add the reducing agent to the permanganate solution at a controlled rate. Acid, when added separately, may be added by a similar device or by simply pouring in a quantity at regular intervals.

The manganese dioxide films are washed by immersion in deionized water which is ultrasonically agitated. The manganese dioxide films are etched and the thickness of the manganese dioxide films are measured by a Taly-Surf measuring instrument sold by Engis Equipment Company, 431 South Seavborn St., Chicago 5, Ill. Thickness measurements are made at various positions on the workpieces to determine the thickness and uniformity of the deposited manganese dioxide. The density and porosity of the films are determined by observing the deposited manganese dioxide under an illuminated microscope. Adherence of the manganese dioxide film is considered satisfactory if the film of manganese dioxide remains on the substrate when a strip of cellophane adhesive tape is pressed onto the surface and then pulled off.

Example 1

1000 ml. of 0.5 molar aqueous potassium permanganate solution are placed in a 2000 ml. beaker and heated to a temperature of approximately 66° C. The permanganate solution is then acidified to a pH of approximately 1.0 by the addition of 11 cc. of concentrated nitric acid. A 25% solution of methyl alcohol (25% methyl alcohol and 75% water, by volume) is added to the acidified permanganate solution from a needle valve buret at the rate of one drop every five seconds.

The deposition of manganese dioxide is conducted for 30 minutes. During this time, the total amount of methyl alcohol solution is approximately 8 ml. The average rate at which methyl alcohol is added to the permanganate solution was .067 ml. per minute per liter of 0.5 molar permanganate solution. At specified intervals during the deposition, additional amounts of concentrated nitric acids are added to the permanganate solution to maintain the acid pH of the solution. These additional amounts of nitric acid are added according to the schedule which follows:

Time, minutes:                              Amount, cc.
    After 10 _____ add 5
    After 20 _____ add 5
    After 25 _____ add 4

Films of manganese dioxide approximately 3500 angstroms thick are deposited on the substrates. These films are dense, uniform and adherent.

Example 2

The same process as described in Example 1 is followed except that 1000 ml. of 0.5 molar sodium permanganate solution is substituted for the 1000 ml. of potassium permanganate solution. Again, dense, uniform and adherent films of manganese dioxide approximately 3500 angstroms thick are deposited on the substrates.

Example 3

350 ml. of a 0.5 molar solution of potassium permanganate are placed in a 500 ml. beaker containing substrates to be coated with manganese dioxide. The beaker was placed on the magnetic stirring hot plate and heated to approximately 60° C. Sufficient concentrated nitric acid is initially added to the solution to reduce the acidity of the solution to a pH of approximately 1.0 as measured by a Beckman type pH meter. 26 ml. of a 10% solution of methyl alcohol are gradually added to the solution over a period of time of approximately 10 minutes. The pH of the solution is continuously monitored by the pH meter and concentrated nitric acid is added as needed to keep the pH of the solution at approximately 1.0. Manganese dioxide films, approximately 4000 angstroms thick, are deposited on the substrates. The films are dense, uniform and adherent.

Example 4

The same process as is described in Example 3 is followed except that concentrated sulphuric acid instead of nitric acid is used to reduce the pH of the solution to approximately 1.5. Concentrated sulphuric acid is also added at intervals to maintain the pH near 1.5. Dense, uniform and adherent films of manganese dioxide, approximately 2500 angstroms thick, are deposited on the substrates.

Example 5

The same process as is described in Example 3 is followed except that concentrated hydrochloric acid instead of nitric acid is used to reduce the pH of the solution to approximately 5.0. Concentrated hydrochloric acid is also added at intervals to maintain the pH near 5.0. Only approximately 500 angstroms of manganese dioxide is measured on the substrates. The films of manganese dioxide are dense, uniform and adherent.

Example 6

150 ml. of a 0.5 molar solution of potassium permanganate are added to a 300 ml. beaker containing substrates. The beaker is placed on a magnetic stirring hot plate and the solution heated to approximately 50° C. Sufficient acetic acid is added to the solution to initially reduce the pH of the solution to approximately 6.0. 40 ml. of a 25% solution of methyl alcohol are gradually added to the solution over a period of approximately 10 minutes. Approximately 2000 angstroms of manganese dioxide are deposited on the substrate. The manganese dioxide films are uniform, dense and adherent.

Example 7

300 ml. of a 1.0 molar potassium permanganate solution are added to a 500 ml. beaker containing substrates. The beaker is placed on a magnetic stirring hot plate and heated to approximately 50° C. 110 ml. of a 10% solution of oxalic acid are added gradually to the solution over a period of approximately 15 minutes. Films of manganese dioxide approximately 2000 angstroms thick are deposited on the substrates. The films are dense, uniform and adherent.

Example 8

180 ml. of a 0.1 molar solution of potassium permanganate are placed in a 300 ml. beaker on a magnetic stirring hot plate. The solution is heated to approximately 50° C. 20 ml. of fuming nitric acid are gradually added to the solution over a period of approximately 15 minutes.

Approximately 2000 angstroms of manganese dioxide are deposited on the substrates in the beaker. The films of manganese dioxide are dense, uniform and adherent.

Example 9

250 ml. of a 0.5 molar potassium permanganate solution are added to a 500 ml. beaker containing substrates. The beaker is placed on a magnetic stirring hot plate and heated to approximately 64° C. Concentrated nitric acid is added to the solution to reduce the pH to approximately 1.0. 34 ml. of an 8% solution of formic acid are gradually added to the solution over a period of approximately 20 minutes. 1000 angstroms of manganese dioxide are deposited on the substrates. The manganese dioxide films are dense, uniform and adherent.

Example 10

250 ml. of a 0.5 molar solution of potassium permanganate are placed within a 500 ml. beaker containing substrates. The beaker is placed on a magnetic stirring hot plate and heated to approximately 60° C. Concentrated nitric acid is added to the solution to reduce the pH of the solution to approximately 1.0. 10 ml. of a 10% solution of formaldehyde is gradually added to the solution over a period of approximately 10 minutes. Additional nitric acid is added as needed to maintain the pH at approximately 1.0. A dense, uniform and adherent layer of manganese dioxide which is approximately 1700 angstroms thick are deposited on the substrates.

The preceding examples can be repeated with similar success by substituting the generically or specifically described reactants and/or operating conditions of this invention for those used in the preceding examples.

It is to be understood that the above-described processes are simply illustrative of the principles of the invention and that many other processes can be devised without departing from the spirit and scope of the invention.

What is claimed is:

1. A process of depositing a film of manganese dioxide on a workpiece, comprising:
    immersing the workpiece in an aqueous permanganate solution having a molar concentration of about 0.01 to 1.0; and
    adding a reducing agent at a rate not exceeding 0.1 moles of reducing agent per minute based on 1 liter of a 0.5 molar solution of permanganate, the reducing agent being capable of reducing permanganate to manganese dioxide.

2. A process as defined in claim 1 wherein the rate of addition of the reducing agent does not exceed 0.01 mole per minute.

3. A process as defined in claim 1 wherein:
    the permanganate solution contains permanganate ions in a molar concentration within the range 0.1 to 0.5; and
    the reducing agent is selected from the group consisting of methyl alcohol, nitrogen dioxide, oxalic acid, formic acid, and formaldehyde.

4. A process as defined in claim 1 wherein the reduction step is conducted at a temperature above 50° C. and under conditions of vigorous agitation.

5. A process as defined in claim 4 wherein the workpiece has a dielectric metal oxide layer upon which manganese dioxide is deposited.

6. A process as defined in claim 1 comprising a further step of adding an acid to the permanganate solution prior to adding the reducing agent.

7. A process as defined in claim 6, wherein:
    the acid reduces the pH of the solution to a pH less than 7; and
    the reducing agent is added at a rate less than 0.01 mole per minute.

8. A process of depositing a film of manganese dioxide on a workpiece, comprising:
    immersing the workpiece in an aqueous permanganate solution having a molar concentration of about 0.01 to 1.0; and
    adding a reducing agent at a sufficiently gradual rate to the permanganate solution to deposit a film of manganese dioxide on the workpiece at a substantially linear rate of not more than 10 angstroms of film thickness per second, the reducing agent being capable of reducing permanganate to manganese dioxide.

9. A process as defined in claim 8 wherein the manganese dioxide is deposited at a substantially linear rate of not more than 4 angstroms per second.

10. A process as defined in claim 8 wherein the manganese dioxide is deposited at a substantially linear rate in the range of 2 to 4 angstroms per second.

11. A process as defined in claim 8 wherein:
    the permanganate solution contains permanganate ions in a molar concentration within the range of 0.1 to 0.5; and
    the reducing agent is selected from the group consisting of methyl alcohol, nitrogen dioxide, oxalic acid, formic acid, and formaldehyde.

12. A process as defined in claim 8 wherein the reduction step is conducted at a temperature above 50° C. and under conditions of vigorous agitation.

13. A process as defined in claim 12 wherein the workpiece has a dielectric metal oxide layer upon which manganese dioxide is deposited.

14. A process as defined in claim 8 comprising a further step of adding acid to the permanganate solution prior to adding the reducing agent.

15. A process as defined in claim 14, wherein:
    the acid reduces the pH of the solution to less than 7; and
    the manganese dioxide is deposited at a substantially linear rate of not more than 4 angstrom per second.

16. A process of depositing a film of manganese dioxide on a workpiece, comprising:
    immersing the workpiece in an aqueous permanganate solution having a molar concentration of about 0.01 to 1.0; and
    gradually adding a reducing agent at a substantially linear rate to the permanganate solution over a period of at least three minutes to deposit an adherent film of manganese dioxide on the workpiece at a linear rate of not more than 10 angstroms of film thickness per second, the reducing agent being capable of reducing permanganate to manganese dioxide.

17. A process as defined in claim 16 wherein the reducing agent is added to the permanganate solution at a substantially linear rate over a period of at least 15 minutes.

18. A process as defined in claim 16 wherein the reducing agent is added to the permanganate solution at a substantially linear rate over a period of at least 30 minutes.

19. A process as defined in claim 16 wherein:
    the permanganate solution contains permanganate ions in a molar concentration within the range of 0.1 to 0.5; and
    the reducing agent is selected from the group consisting of methyl alcohol, nitrogen dioxide, oxalic acid, formic acid, and formaldehyde.

20. A process as defined in claim 16 wherein the reduction step is conducted at a temperature above 50° C. and under conditions of vigorous agitation.

21. A process as defined in claim 20 wherein the workpiece has a dielectric metal oxide layer upon which manganese dioxide is deposited.

22. A process as defined in claim 16 comprising a further step of adding acid to the permanganate solution prior to adding the reducing agent.

23. A process as defined in claim 22, wherein:
    the acid reduces the pH of the solution to less than 7; and the reducing agent is added to the permanganate solution at a substantially linear rate over a period of at least 15 minutes.

24. In a process of depositing a film of manganese dioxide on a substrate, which process comprises adding a reducing agent to a permanganate solution of precipitate manganese dioxide onto said substrate, an improvement comprising:

adding an acid to the permanganate solution to lower the pH of the solution prior to adding the reducing agent.

25. A process as defined in claim 24 wherein the substrate has a dielectric metal oxide layer upon which manganese dioxide is deposited.

26. A process as defined in claim 24 wherein the acid reduces the pH of the solution to less than 7.

27. A process as defined in claim 14, wherein:
the reducing agent is selected from the group consisting of formic acid, formaldehyde and methyl alcohol;
the acid is selected from the group consisting of nitric acid, sulphuric acid, hydrochloric acid and acetic acid; and
the substrate has a dielectric metal oxide layer upon which manganese dioxide is deposited.

28. A process as defined in claim 24 wherein the acid reduces the pH of the solution to less than 4.

29. A process as defined in claim 28 wherein the reduction step is conducted at a temperature above 50° C. and under condition of vigorous agitation.

30. A process of depositing a film of manganese dioxide on a workpiece, comprising:
immersing the workpiece in an aqueous solution containing permanganate ions in a molar concentration within the range of 0.01 to 1.0;
adding an acid to the permanganate solution to lower the pH of the solution to less than 7; and
adding methyl alcohol to the permanganate solution at a rate not exceeding 0.01 mole of methyl alcohol per minute based on 1 liter of a 0.5 molar solution of permanganate.

31. A process as defined in claim 30, wherein:
the acid reduces the pH of the solution to less than 4; and
the methyl alcohol is added to the permanganate solution at a rate not exceeding 0.01 mole of methyl alcohol per minute.

32. A process as defined in claim 30, wherein:
the workpiece has a dielectric metal oxide layer upon which manganese dioxide is deposited;
the acid lowers the pH of the solution to a pH within the range 0.8 to 2.0;
the methyl alcohol is added to the permanganate solution at a rate not exceeding 0.004 mole of methyl alcohol per minute; and
the reduction step is conducted at a temperature above 50° C. and under conditions of vigorous agitation.

33. A process of depositing a film of manganese dioxide on a workpiece, comprising:
immersing the workpiece in an aqueous solution containing permanganate ions in a molar concentration within the range 0.01 to 1.0;
adding an acid ot the permanganate solution to lower the pH of the solution to less than 7; and
adding methyl alcohol to the permanganate solution at a gradual rate to deposit manganese dioxide on the workpiece at a substantially linear rate of not more than 10 angstroms of film thickness per second.

34. A process as defined in claim 33, wherein:
the acid lowers the pH of the permanganate solution to less than 4; and
the managanese dioxide is deposited on the workpiece at a substantially linear rate of not more than 4 angstroms per second.

35. A process as defined in claim 34, wherein:
the workpiece has a dielectric metal oxide layer upon which manganese dioxide is deposited;
the acid lowers the pH of the solution to a pH within the range 0.8 to 2.0; and
the reduction step is conducted at a temperature above 50° C. and under conditions of vigorous agitation.

36. A process of depositing a film of manganese dioxide on a workpiece, comprising:
immersing the workpiece in an aqueous solution containing permanganate ions in a molar concentration within the range 0.01 to 1.0;
adding an acid to the permanganate solution to lower the pH of the solution to less than 7; and
gradually adding methyl alcohol at a substantially linear rate to the permanganate solution over a period of at least 3 minutes to deposit an adherent film of manganese dioxide on the workpiece at a linear rate of not more than 10 angstroms of film thickness per second.

37. A process as defined in claim 36, wherein:
the acid lowers the pH of the permanganate solution to less than 4; and
the methyl alcohol is added to the permanganate solution at a substantially linear rate over a period of at least 15 minutes.

38. A process as defined in claim 36, wherein:
the workpiece has a dielectric metal oxide layer upon which manganese dioxide is deposited;
the acid lowers the pH of the solution to a pH within the range 0.8 to 2.0;
the methyl alcohol is added to the permanganate solution at a substantially linear rate over a period of at least 30 minutes; and
the reduction step is conducted at a temperature above 50° C. and under conditions of vigorous agitation.

References Cited

UNITED STATES PATENTS

| | | | |
|---|---|---|---|
| 3,093,883 | 6/1963 | Haring et al. | 29—25.42 |
| 3,277,553 | 10/1966 | Wesolowski | 29—25.41X |
| 3,432,918 | 3/1969 | Riley et al. | 117—106X |

OTHER REFERENCES

W. J. Blaedel and V. W. Meloche; Elementary Quantitative Analysis; Row, Peterson and Co.; Evanston, Ill., 1957, pp. 440-446.

ALFRED L. LEVITT, Primary Examiner

C. K. WEIFFENBACH, Assistant Examiner

U.S. Cl. X.R.

29—25.42; 117—169, 215